United States Patent
Bayer et al.

(10) Patent No.: US 6,730,394 B2
(45) Date of Patent: May 4, 2004

(54) FIBRE-REINFORCED PLASTIC PART

(75) Inventors: Albert Bayer, Augsburg (DE);
Wolfgang Bohlken, Friedberg (DE);
Joachim Markert, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 16 days.

(21) Appl. No.: 10/144,811

(22) Filed: May 14, 2002

(65) Prior Publication Data

US 2003/0008124 A1 Jan. 9, 2003

(30) Foreign Application Priority Data

May 17, 2001 (DE) .......................................... 101 24 023

(51) Int. Cl.[7] .............................................. B32B 15/04
(52) U.S. Cl. .................... 428/293.1; 428/323; 428/328; 428/332
(58) Field of Search ................................ 264/137, 257; 428/293.1, 323, 328, 332

(56) References Cited

U.S. PATENT DOCUMENTS 4,650,620 A  * 3/1987 Owen et al.

6,203,737 B1     3/2001 Zurbuchen

FOREIGN PATENT DOCUMENTS

| DE | 91 04 086 U1 | 8/1991 |
|----|---|---|
| EP | 1 068 926 | 1/2001 |

* cited by examiner

Primary Examiner—Merrick Dixon
(74) Attorney, Agent, or Firm—McGlew and Tuttle, P.C.

(57) ABSTRACT

On joining a fibre-reinforced plastic part, such as a plastic fibre-reinforced robot arm, to a functional element such as a gear, as a result of the flow characteristics of the plastic in the case of a high pressing action or high pressures, the joints are no longer stable or resistant and instead tend to loosen. To obviate this problem, the invention provides a fibre-reinforced plastic part, in which several metallic parts (6) engage through at least one fibre-reinforced shoulder (4). On one side of the shoulder or shoulders (4) is provided at least one metallic abutment (8) engaging over several metallic parts (6) and a functional element (2) is braced from the opposite side of the shoulder or shoulders (4) with the abutment (8) against the front ends (6a), facing the latter, of metallic parts (6).

20 Claims, 3 Drawing Sheets

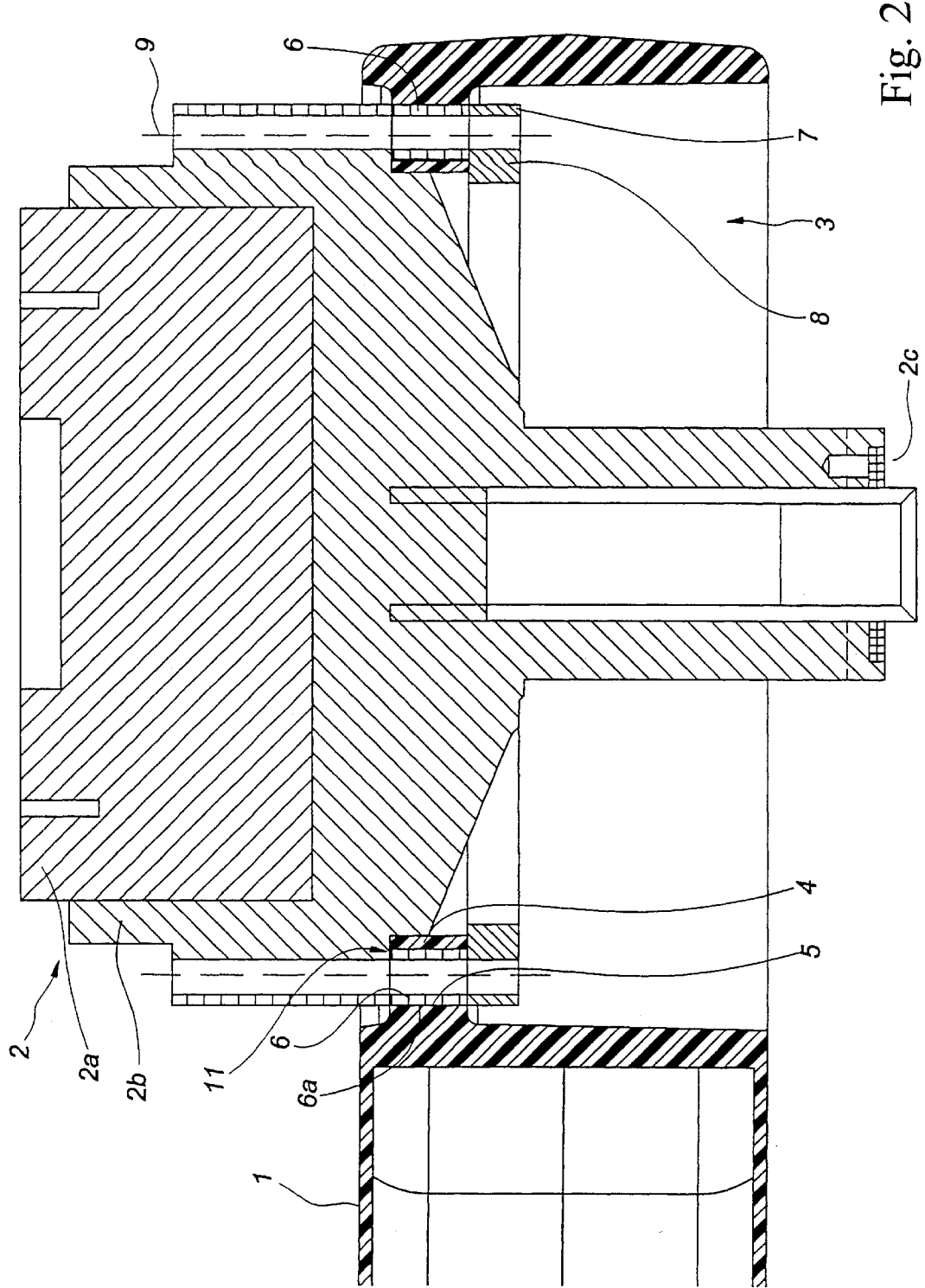

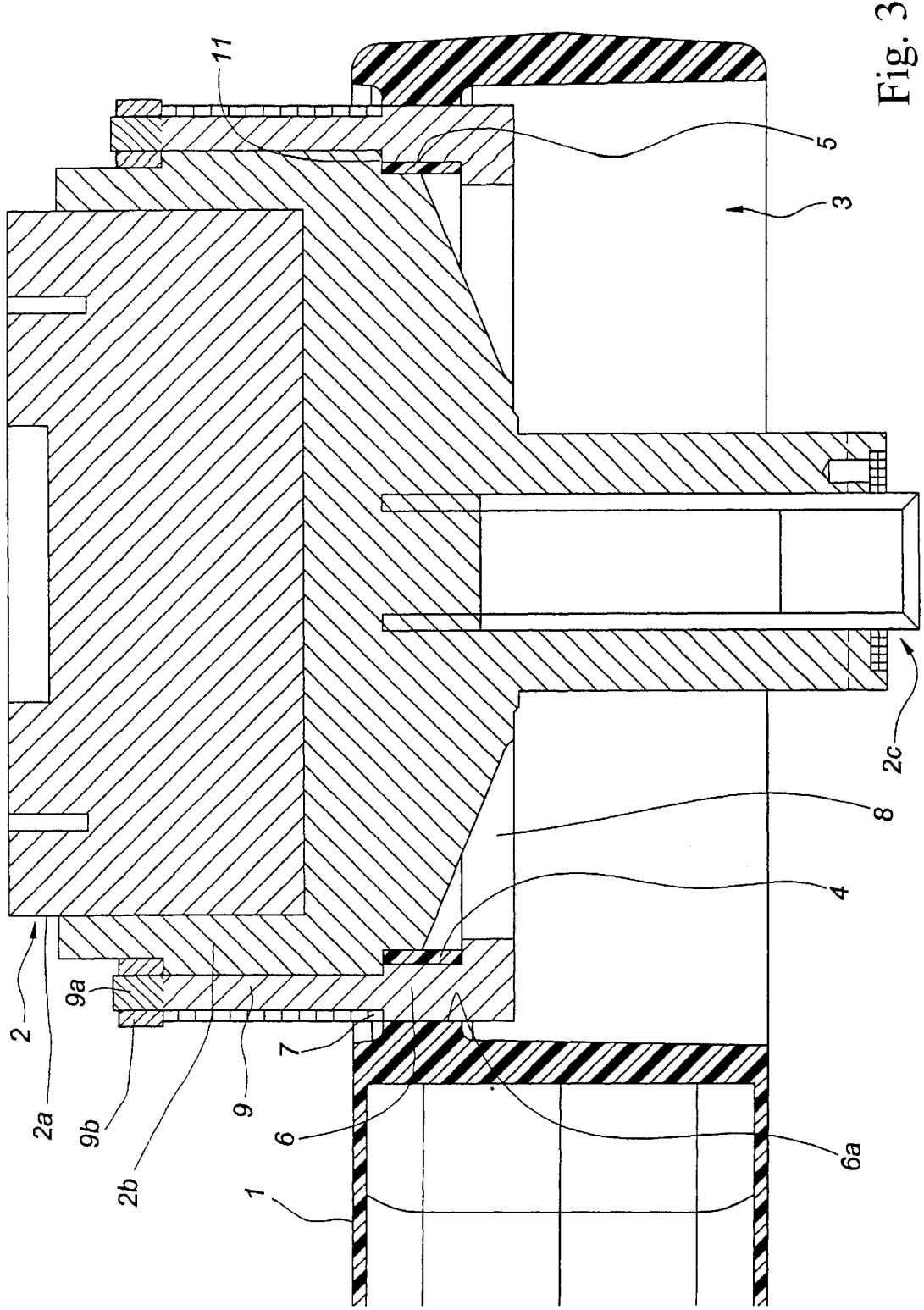

FIBRE-REINFORCED PLASTIC PART

FIELD OF THE INVENTION

The invention relates to a fibre-reinforced plastic part.

BACKGROUND OF THE INVENTION

The functional element is generally a substantially metallic part, particularly with a casing, where relative movements occur, such as a gear or a motor.

The problem of the invention is to avoid the aforementioned disadvantages in a fibre-reinforced plastic part.

SUMMARY OF THE INVENTION

In the case of a fibre-reinforced plastic part, the invention solves the set problem in that at least one metallic part is integrated into the fibre-reinforced plastic part.

According to a preferred development, the at least one metallic part integrated into the plastic part serves as a supporting element for a functional element, such as a gear or the like. It has been found that in the connection of a fibre-reinforced plastic part, such as a fibre-reinforced plastic robot arm, to a functional element, such as a gear, as a result of the flow characteristics of the plastic, in certain cases that under high pressures or pressing actions the connections or joints are not stable or resistant and instead tend to loosen. In such a case, according to a particularly preferred development of the invention, on one side of the shoulder or shoulders is provided at least one metallic abutment in each case engaging over several metallic parts and that a functional element is braced from the opposite side of the shoulder or shoulders with the abutment against the front ends of the metallic parts facing the same.

Thus, the pressure arising during the fixing of the functional element by bracing largely acts on the end faces of the metallic parts passing through the shoulder or shoulders and not directly on the plastic shoulders themselves, so that the force and moment transmission takes place via the outer faces of the inserted metallic parts on the plastic part and not via the contact surface of gear and abutment on the fibre-reinforced plastic shoulders of the plastic part. This is assisted in that an independent abutment is not in each case associated with the metallic part traversing the shoulder, so that the number of abutments corresponds to the number of traversing metallic parts and instead several metallic parts traversing the shoulders have a common abutment engaging over the same. In a specific development, in the case of a ring flange-like inner shoulder of the fibre-reinforced plastic part, the abutment can be formed by a steel counterring passed over the entire circumference of the shoulder.

According to a first preferred embodiment of the invention, bracing takes place by means of screws, said screws being cap screws and/or the bracing takes place by screw-nut joints.

In an extremely preferred construction of the invention, several metallic parts engaging through the shoulder or shoulders and an abutment are constructed in one piece with one another. The metallic part is preferably constructed as a sleeve.

According to a further development according to the invention, the abutments and several screws are constructed in one piece with one another and in particular the metallic parts are constructed in one piece with threaded bolts and abutments, the metallic part having a larger diameter than the threaded bolts, so that between the latter and the metallic part is formed a step with a frontal contact surface of the part.

The connection of the metallic part to and in the shoulders of the fibre-reinforced plastic part can take place in various ways. In a first variant, the metallic parts are inserted in openings of the shoulder, the parts being pressed into the shoulder and/or the parts are bonded into the shoulder. Alternatively the metallic parts can be moulded into the shoulder.

Thus, in a specific construction, the parts engaging through the shoulder can be sleeves, which may or may not be constructed in one piece with the abutment and then either the sleeves or preferably openings of the abutment are constructed with an internal thread into which the screws can be screwed from the gear side and on the gear side remote from the abutment there is either a screw head or a lock nut screwed onto the thread located there of a threaded bolt.

Particularly if the abutment and the sleeve-like metallic parts engaging through the shoulder are not constructed in one piece, the abutment can be constructed in one piece with several threaded bolts, which engage through the sleeve-like parts passing through the shoulders and the functional element is braced against the sleeve-like, metallic parts by means of the lock nut screwed down with screw thread on the side remote from the abutment. Finally abutments, the metallic parts engaging through the shoulders and the threaded bolts can be all constructed in one piece and it is then essential that the metallic parts engaging through the shoulder at least over the thickness thereof have a larger diameter than the threaded bolts, so that between the threaded bolts and the metallic parts a step is formed and consequently on the side of the metallic parts remote from the abutment construction takes place with frontal contact surfaces for the functional element. Here again bracing takes place by means of the lock nuts screwed zonally onto the threaded bolts.

BRIEF DESCRIPTION OF THE DRAWINGS

Further advantages and features of the invention can be gathered from the claims and the following description of an embodiment of the invention with reference to the attached drawings, wherein show:

FIG. 2 A section corresponding to II—II through part of the fibre-reinforced plastic part of FIG. 1.

FIG. 3 A partial representation of another embodiment of the invention.

DETAILED DESCRIPTION OF THE DRAWINGS

Figure 1:
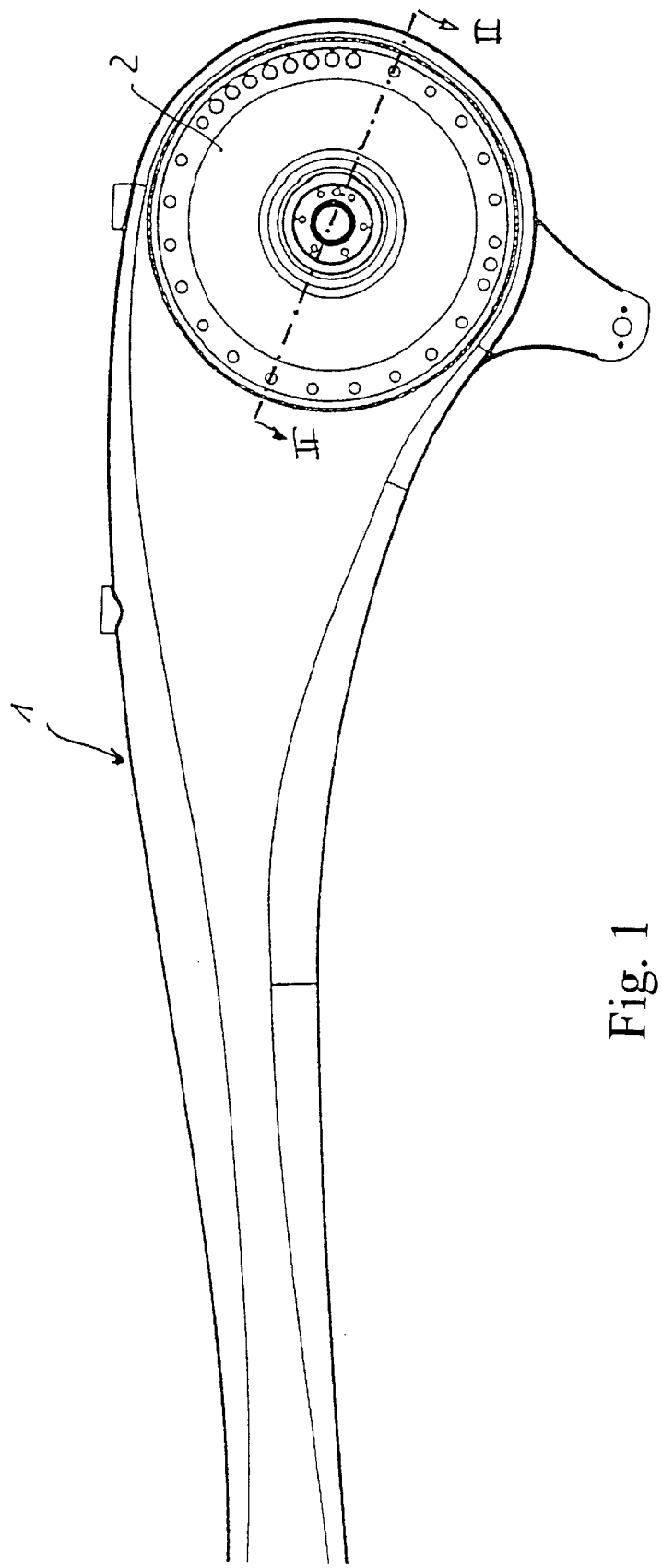
FIG. 1 A fibre-reinforced plastic part according to the invention in the form of a robot arm and in side view.

A fibre-reinforced plastic part 1, such as a fibre-reinforced or preferably carbon fibre-reinforced plastic part, preferably in the form of a robot arm, in the represented embodiment is provided with a gear as the functional element 2. Parts 2a, 2b of the gear 2 can move relative to one another. The part 2a is connected in fixed manner to a rocker of a robot and a drive motor engages at 2a. For this purpose at at least one end the plastic part 1 has an opening 3 into which projects a ring flange-like shoulder 4. In the represented embodiment the shoulder 4 has a plurality of openings 5 in which are inserted metallic part 6 in the form of metal sleeves. On one front end 7 of the parts 6 and therefore on a first side of the shoulder 4 is provided as the abutment 8 a steel counterring extending over the entire circumference of the annular shoulder 4. The functional element 2 is braced by screws 9 intimated in broken line form from the side 11 of part 6 opposite to side 7 and shoulder 4 with abutment 8 against parts 6. The latter have a length at least corresponding to and preferably slightly exceeding the width of the shoulder 4.

It is important that the abutment 8 engages over several parts 6 and therefore openings 5 of the shoulder 4 and the pressure arising on tightening the screws 9 at least largely acts on the front ends of the parts 6 facing the gear, so that during the operation of the gear by means of a not shown motor, this takes place via the outer faces of the metallic parts 6 inserted in the shoulder 4 and consequently not via the frontal contact faces of the shoulder 4 with the gear and the metal abutment.

Another embodiment of the invention is shown in FIG. 3, where the abutment 8 engaging over the openings 5 and correspondingly several metallic parts 6 passing through the same and several threaded bolts 9 are constructed in one piece. It is important that the threaded bolts 9 are not constructed with the same thickness from the abutment 8 to the screw thread end 9a thereof by means of which the gear 2 is braced by lock nuts 9b and instead the metallic parts 6 passing through the openings 5 of shoulder 4 have a larger diameter than the threaded bolt 9 and consequently form an abutment 8 for the engagement of the gear 2. Thus, here again on tightening the screw-nut joint 9, 9a, 9b, the pressure arising largely acts on the front ends 7 of the metallic parts 6 and the force-moment transmission during the operation of the gear 2 again takes place via the outer faces 6a of the metallic parts 6 on the inner walls of the shoulder 4 and not via frontal contact faces of the shoulder 4 with the gear 2 and abutment 8.

Numerous intermediate forms are conceivable with respect to the constructions shown in FIGS. 2 and 3. Thus, the abutment 8 can be constructed in one piece with screws 9, which pass through the independent, sleeve-like parts 6. The screws 9 of FIG. 2 can be constructed as cap screws or according to FIG. 3 and also FIG. 2, can be braced at their gear side with lock nuts. In the development of FIG. 2 the abutment 8 need not be provided with internal threads. Instead the screws can extend through the abutment 8 and can be braced by lock nuts oh the outside thereof.

LIST OF REFERENCE NUMERALS

| | |
|---|---|
| 1 | Plastic part |
| 2 | Functional element |
| 3 | Opening |
| 4 | Shoulder |
| 5 | Openings |
| 6 | Metallic parts |
| 6a | Outer face of parts (6) |
| 7 | Front end of parts (6) |
| 8 | Abutment |
| 9 | Screws |
| 9a | Screw thread end |
| 9b | Lock nut |
| 11 | Opposite side (of 7) |

What is claimed is:

1. A fiber-reinforced plastic part, such as a robot arm, for holding a functional element, such as a gear mechanism, the plastic part comprising:
    at least one fiber-reinforced shoulder or shoulders;
    a plurality of metallic parts extending through said at least one fiber-reinforced shoulder or shoulders;
    at least one said metallic abutment which extends over said plurality of said metallic parts, said metallic abutment being arranged on one side of said shoulder or shoulders, the functional element being braced with said abutment from an opposite side of said shoulder against front sides of said metallic parts, said front sides facing said functional element.

2. Plastic part according to claim 1, characterized in that bracing takes place by screws.

3. Plastic part according to claim 2, characterized in that the screws are cap screws.

4. Plastic part according to claim 2, characterized in that bracing takes place by means of screw-nut joints.

5. Plastic part according to claim 1, characterized in that several metallic parts engaging through the shoulder or shoulders and said abutment are constructed in one piece with one another.

6. Plastic part according to claim 1, characterized in that the metallic parts are sleeves.

7. Plastic part according to claim 2, characterized in that said abutment and said screws are constructed in one piece with one another.

8. Plastic part according to claim 1, characterized in that the metallic parts are constructed in one piece with threaded bolts and said abutment, the metallic part having a larger diameter than the threaded bolts, so that between the threaded bolts and the metallic part is formed a step with a frontal contact surface of the part.

9. Plastic part according to claim 1, characterized in that the metallic parts are inserted in openings of the shoulder or shoulders.

10. Plastic part according to claim 9, characterized in that the parts are one of pressed into the plastic part/shoulder, and bonded into the plastic part/shoulder.

11. Plastic part according to claim 1, characterized in that the metallic parts are molded into the plastic part/shoulder.

12. Plastic part according to claim 1, characterized in that the length of the metallic parts at least corresponds to and preferably slightly exceeds the width of the plastic part/shoulder.

13. A fiber-metal-plastic arrangement comprising:
    a fiber reinforced plastic part having diametrically opposite first and second sides, and a thickness between said first and second sides;
    a metallic abutment arranged on said second side of said plastic part;
    a functional element arranged on said first side of said plastic part;
    a metal connection from said function element through said plastic part to said metallic abutment for forcing said functional element and said metallic abutment together, said metal connection having a shape to block said functional element and said abutment from coming closer than said thickness of said plastic part.

14. An arrangement in accordance with claim 13, wherein:
    said metal connection includes a metal part extending through plastic part from said first side to said second side, said cross section being exposed on said first and second sides of said plastic part;
    said metal connection includes an extension extending away from said first side of said plastic part and extending through said functional element, said functional element being movable on said extension toward and away from said first side of said plastic part, said extension having a cross section smaller than said cross section of said metal part, said cross section of said metal part blocking movement of said functional element into said plastic part.

15. An arrangement in accordance with claim 13, wherein:

said metal connection includes a metal part extending through plastic part from said first side to said second side, said metal part having a cross section and defining an opening from said first side to said second side, said cross section being exposed on said first and second sides of said plastic part;

said metal connection includes a screw extending through said opening of said metal part and through said functional element, said functional element being movable on said screw toward and away from said first side of said plastic part, said cross section of said metal part blocking movement of said functional element into said plastic part.

16. An arrangement in accordance with claim 13, further comprising:

a plurality of said metal connections from said function element through said plastic part to said metallic abutment for forcing said functional element and said metallic abutment together, said plurality of metal connections having a shape to block said functional element and said abutment from coming closer than said thickness of said plastic part.

17. A robotic arrangement comprising:

a robot arm having a fiber reinforced plastic part with diametrically opposite first and second sides, and a thickness between said first and second sides;

a metallic abutment arranged on said second side of said plastic part;

a gear element arranged on said first side of said plastic part;

a metal connection from said gear element through said plastic part to said metallic abutment for forcing said gear element and said metallic abutment together, said metal connection having a shape to block said gear element and said abutment from coming closer than said thickness of said plastic part.

18. An arrangement in accordance with claim 17, wherein:

said metal connection includes a metal part extending through plastic part from said first side to said second side, said metal part having a cross section, said cross section being exposed on said first and second sides of said plastic part;

said metal connection includes an extension extending away from said first side of said plastic part and extending through said gear element, said gear element being movable on said extension toward and away from said first side of said plastic part, said extension having a cross section smaller than said cross section of said metal part, said cross section of said metal part blocking movement of said gear element into said plastic part.

19. An arrangement in accordance with claim 17, wherein:

said metal connection includes a metal part extending through plastic part from said first side to said second side, said metal part having a cross section and defining an opening from said first side to said second side, said cross section being exposed on said first and second sides of said plastic part;

said metal connection includes a screw extending through said opening of said metal part and through said gear element, said gear element being movable on said screw toward and away from said first side of said plastic part, said cross section of said metal part blocking movement of said gear element into said plastic part.

20. An arrangement in accordance with claim 17, further comprising:

a plurality of said metal connections from said gear element through said plastic part to said metallic abutment for forcing said gear element and said metallic abutment together, said plurality of metal connections having a shape to block said gear element and said abutment from coming closer than said thickness of said plastic part;

said gear element including first and second parts, said first part being rotatable in said second part, said second part being fixed by said metal connection to said robot arm;

a rocker of a robot fixed to said first part of said gear element;

a drive motor engaging said first part of said gear element.

* * * * *